United States Patent
Beans et al.

(10) Patent No.: US 9,516,478 B2
(45) Date of Patent: Dec. 6, 2016

(54) SYSTEMS AND METHODS FOR PROVIDING A PERSONALIZED TEXTING BASE

(71) Applicants: Eric Beans, Orlando, FL (US); Alexander Shaffer, Orlando, FL (US)

(72) Inventors: Eric Beans, Orlando, FL (US); Alexander Shaffer, Orlando, FL (US)

( * ) Notice: Subject to any disclaimer, the term of this patent is extended or adjusted under 35 U.S.C. 154(b) by 55 days.

(21) Appl. No.: 14/693,435

(22) Filed: Apr. 22, 2015

(65) Prior Publication Data

US 2015/0312733 A1 Oct. 29, 2015

Related U.S. Application Data

(60) Provisional application No. 61/983,726, filed on Apr. 24, 2014.

(51) Int. Cl.
| | |
|---|---|
| *H04W 4/12* | (2009.01) |
| *H04L 12/58* | (2006.01) |
| *H04L 29/12* | (2006.01) |
| *H04W 4/08* | (2009.01) |

(52) U.S. Cl.
CPC .............. *H04W 4/12* (2013.01); *H04L 51/063* (2013.01); *H04W 4/08* (2013.01); *H04L 61/1594* (2013.01)

(58) Field of Classification Search
CPC .. H04L 51/063; H04L 61/1594; H04W 4/08; H04W 4/12
See application file for complete search history.

(56) References Cited

U.S. PATENT DOCUMENTS

| | | | | |
|---|---|---|---|---|
| 2005/0010644 | A1* | 1/2005 | Brown | G06Q 10/107 709/206 |
| 2008/0250330 | A1* | 10/2008 | Thompson | G06Q 10/10 715/751 |
| 2011/0145356 | A1* | 6/2011 | Tanner | H04L 51/34 709/206 |
| 2013/0073381 | A1* | 3/2013 | Binkley | G06Q 30/02 705/14.48 |

* cited by examiner

*Primary Examiner* — Kashif Siddiqui
(74) *Attorney, Agent, or Firm* — Jason T. Daniel, Esq.; Daniel Law Offices, P.A.

(57) ABSTRACT

A system and method for creating a texting base. The system and method include functionality for allowing a primary user to upload contact information having unique recipient data, store the same onto a system database, and create group messages having core content and unique recipient data. The messages are sent individually by the system utilizing a system assigned telephone number.

14 Claims, 10 Drawing Sheets

SYSTEMS AND METHODS FOR PROVIDING A PERSONALIZED TEXTING BASE

CROSS-REFERENCE TO RELATED APPLICATIONS

This application claims the benefit of U.S. Application Ser. No. 61/983,726 filed on Apr. 24, 2014, the contents of which are incorporated herein by reference.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to text based communication systems, and more particularly to a system and method for providing group texts that are personalized for each recipient.

BACKGROUND

The statements in this section merely provide background information related to the present disclosure and may not constitute prior art.

Text messaging has become a staple of communication between individuals both in the United States, and across the globe. Device-to-device written messages allow people to type or speak communications to individuals and/or groups of individuals in real time and in near-real time. Although originally text messaging was used as a private means of communication between individuals, and small groups of people with existing personal relationships (e.g., friends and family), the trend of communicating via text messaging is gaining popularity among small and large companies who seek to keep in touch with existing and potential customers.

In this regard, the evolving trend of consumer driven text messages has led to many companies routinely sending mass messages to many individuals at once. As described herein, "mass texting" typically involves the process of uploading multiple phone numbers, typing a single message, and having that same exact message delivered to every phone number on the list. One common example of a mass text message by companies is to send a mass holiday message to all of its customers. However, owing to the wide array of different religions whose followers celebrate different holidays and/or who do not celebrate holidays at all, companies employing these mass holiday messages face the potential for unintentionally sending an inappropriate message to a customer.

Although the concept of communicating simultaneously with multiple individuals is sound, the practical execution of such messages faces two main challenges: 1) Legal: Mass texting is invasive and a violation of the law if done incorrectly; and 2) Impersonal: Because everyone receives the exact same message, these messages are often not well received by the recipients who may feel that they are being "spammed" by the sender.

Because personalized communication is crucial to maintaining and elevating relationships in both business and private relationships, many individuals choose not to send mass texts. This is because, traditionally, personalizing communication can only be done a single message at a time. Stated differently, by using traditional methodology (i.e., personalized text messages) individuals enjoy an increase in efficiency, whereas companies using mass messaging (currently SMS texting) leads to a lessened impact on each individual receiving the message.

"Personal communication" in bulk messaging does not currently exist in the marketplace. Current bulk messaging typically means a set message sent to multiple individuals. This message may or may not refer to a product or service the recipient showed interest in. As such, there is nothing personal to about the message to each of the recipients, and the language and tone of the message does not reflect a typical dialogue between individuals. In this regard, communication between individuals varies greatly depending on whom they are texting with. For example, the tone and style of a text message one user sends to their employer will typically be much different that the tone and style the same individual will send to their best friend or spouse.

Accordingly, there remains a need for a method of providing a personalized texting base which can overcome the drawbacks and problems associated with the practice of mass texting, as described above.

SUMMARY OF THE INVENTION

The present invention is directed to a system and method for creating a texting base, wherein a user can send group text messages having core content and unique recipient details that are embedded within the text of the message.

One embodiment of the present invention can include a site owner system having a website for facilitating communication with the user. Upon establishing communication, the user can upload a contact list having an unlimited amount of unique recipient data for each contact. The system can also assign a telephone number to the user from which text messages can be sent to each contact.

In one embodiment, the system can generate a message presentation screen having a text box and a plurality of personal detail tabs that correspond to the unique recipient data. The user can enter a core message and insert any number of unique recipient data into the same. Upon receiving a send instruction from the user, the system can create and send a single text message to each recipient having the core message and the unique recipient data pertaining to that recipient.

Another embodiment of the present invention can include the ability to assign multiple telephone numbers to a sender that correspond to each area code at which a recipient is located.

Yet another embodiment of the present invention can include the ability to schedule messages to be sent upon the occurrence of a special event such as a holiday or birthday, wherein each such message will contain a core message and unique recipient data.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
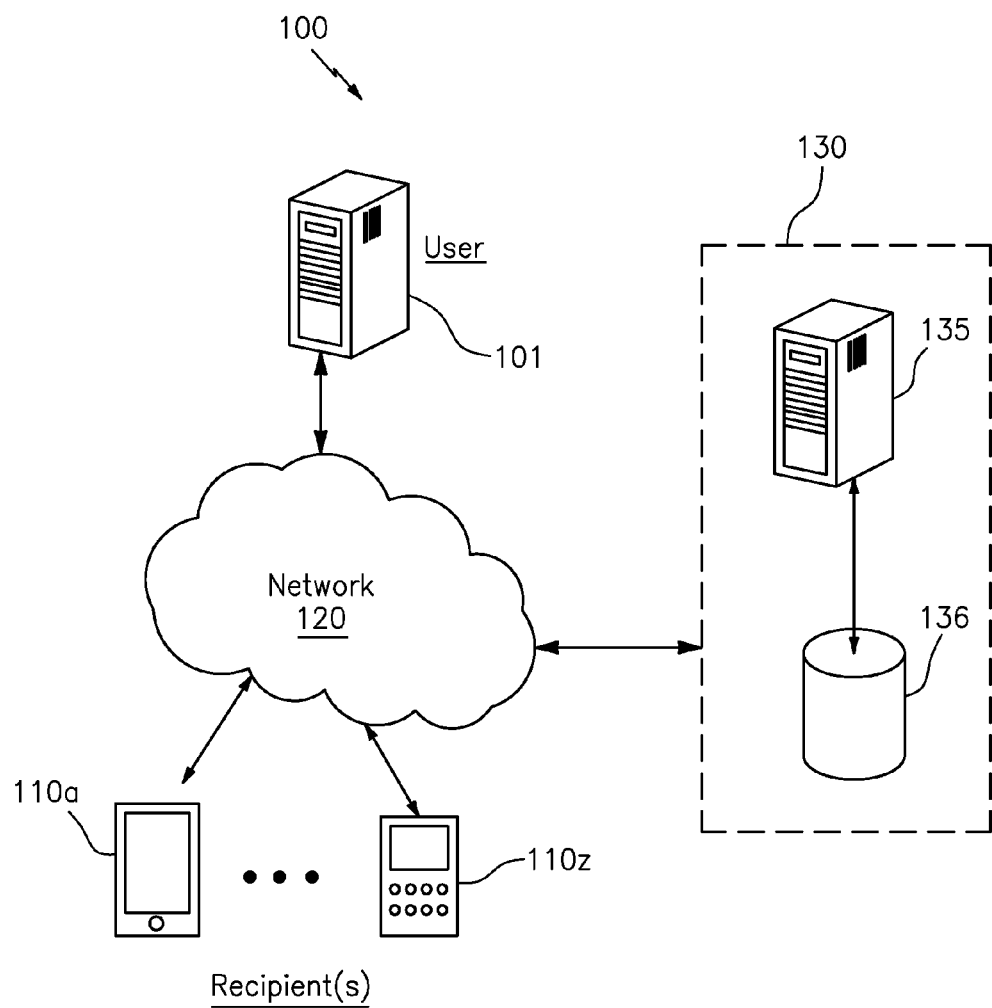
FIG. 1 shows an exemplary network environment according to some embodiments of the technology.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure.

The presently claimed invention contemplates a system and method for performing a personalized texting base utilizing the internet and one or more mobile devices. As will be described below in detail, the system and method can function to allow system users to create and send individual and/or scheduled mass text messages to smartphones and other such devices. Each of the messages can include uniform core content having any number of personalized data embedded therein so as to appear to be a unique individual message to each recipient. The method can also employ any number of algorithms that are capable of learning how an individual communicates with another individual, in order to allow the system to adjust the tone and communication options for each successive message to suit the dynamics of each particular relationship.

As described throughout this document, the terms "user," "primary user" and "sender" can be used interchangeably to include any person utilizing the system and/or method to communicate with others via a text message as described herein. The term "recipient" and "contact" can be used interchangeably to include a person or entity that is to receive a text message from a sender via the system. Additionally, the term "site owner" can describe the individual or legal entity that is providing the system and/or performing the method steps disclosed herein.

In one preferred embodiment, a system for providing a texting base can be performed utilizing one or more websites having any number of different URL addresses. Additionally, it is contemplated that several different methods and/or method steps can be performed simultaneously via different websites that are directed towards different individual markets and/or geographic locales. Such methods can be performed under the direct supervision of the original site owner, or via secondary site owners through a franchise or other form of legal agreement.

FIG. 1 is a schematic illustration of an exemplary system operating environment 100 for implementing a personalized texting base. As shown, the system 100 can include at least one user interface device 101, a plurality of recipient interface devices 110a-110z (referred to hereinafter collectively as 110), a communication network 120 and a site owner 130.

In one embodiment, the site owner 130 can include or utilize one or more individual computers/computing devices 135 that can be connected to one or more databases 136 on which various portions of the texting base platform can reside. The site owner 130 can function to provide a central hub and a website for controlling the communication between the interface devices 101, and 110. In one embodiment, the website can display a number of different presentation screens for receiving and displaying information as described below.

In this regard, portions of the texting base platform can be implemented as a computer program product, i.e., a computer program tangibly embodied in a non-transient machine-readable storage device, for execution by, or to control the operation of, a data processing apparatus. The computer program can be written in any form of computer or programming language, including source code, compiled code, interpreted code, scripting code (e.g., Javascript) and/or machine code, and the computer program can be deployed in any form, including as a stand-alone program or as a subroutine, element, or other unit suitable for use in a computing environment.

The database 136 can function to receive and store any form of information. In one embodiment, the database can function to receive and store operating instructions for the system and/or website, along with unique recipient data. As described herein, the database 136 can include any number, and any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. In addition, the devices can be operatively coupled to a communications network, such as network 120, to receive instructions and/or data from the network and/or to transfer instructions and/or data to the network.

Each of the interface devices 101 and 110 can be a computing device that is operated by a human user. A computing device refers to any device with a processor and memory that can execute instructions. Computing devices include, but are not limited to, personal computers, cellular telephones with SMS text messaging capability and/or mobile internet functionality, tablet computers, laptop computers and other such devices. In either instance, each of the computing devices can include one or more client applications, such as a conventional web browser and/or text messaging functionality, for example, which can allow the device user to communicate with other interface devices and/or the site owner 130.

The network 120 can include any known means for textual and/or data communication such as, for example, the internet, a cellular data network, and/or a VOIP SMS text messaging service, without limitation.

A method for providing a personalized texting base can include any number of different units and/or modules which can be executed by the site owner devices 135. Several such units are described below, however any number of other units are also contemplated.

Data Pull Unit

In one embodiment, the texting base platform can include a data pull unit which can function to allow a sender to retrieve unique recipient data, and to insert the same into a group message. As will be described below, the data pull unit allows each recipient to receive a message having substantially identical core content, but with details that are unique to the recipient. Several nonlimiting examples of unique recipient data can include the first and last name of the recipient, their favorite sports team(s), names of their children and spouses, religion, hobbies, affiliations and the like. Additionally, the data pull unit can allow senders to create any number of custom fields wherein additional user-defined recipient data can be stored, retrieved and incorporated into one or more group messages.

In essence, the data pull unit can allow a sender to choose from literally hundreds of unique recipient data fields, which can be inserted into a group message, in order to allow each recipient to receive the same core information (i.e., the intent of the message), along with identifiers that are unique to each recipient, so as to appear to be a single personalized text message from the sender to a single individual.

In addition to the above, the data pull unit can also function to retrieve content from external sources such as the internet, for example, based on the unique recipient data. For example, if the recipient(s) are fans of a particular sports team, the data pull unit can initiate a web browser and perform an internet search for recent articles written about the team. This information can be presented to the sender, and a link to the external article, or text from the same, can be inserted into the message by the sender.

Communication Profiler Unit

The communication profiler unit of the texting base can use the unique recipient data, along with the communication history between specific senders and recipients to identify and/or generate a communication profile. In this regard, the communication profile unit can search through the unique recipient data for each sender, and can generate a group contact list based on the data. Additionally, the communication profiler unit can analyze previous textual communications between senders and recipients, in order to determine the preferred tone of the messages exchanged. As such, the system can utilize one or more algorithms to determine the average lengths of sentences, the amount and type of punctuation, the average grade level of communication, common words, common sayings, nicknames and the like, and can display message templates using the preferred tone.

Each of these preferences can be stored in a database and can be refined with each subsequent communication between each user. As such, by using a database of the sender and recipients responses, the system can actually "learn" how a user communicates with each of his contacts (i.e., recipients) and can provide options for the sender to further customize and personalize communication with each recipient when sending individual or group messages.

Randomized Response Unit

In one embodiment, the randomizing response unit of the texting base can create a database of responses using the "Communication Profiler", and combine it with standardized "Randomized Responses" for common outbound messages to ensure each message is truly personalized to the recipient. This process can randomize any number of responses, and can provide the recipient with a true "unique" message. For example, if a sender schedules a "happy birthday" message to be sent to a recipient each year, the randomized response unit can make sure that each message is structured differently so as to ensure that no two "happy birthday" messages for the same recipient are identical. As such, the randomized response unit can ensure that each scheduled message sent by a user is not redundant, especially when a user schedules messages years in advance.

By combining the use of the Data Pull unit to store and retrieve unique recipient data, the Communication Profiler unit to adapt the messages to the tone of the sender, and the Randomized Response unit to prevent the sending duplicate messages over time, the system and method provides a platform for creating personalized group messaging that far exceeds the capabilities of any known messaging systems.

FIGS. 2-6B illustrate a method and exemplary presentation screens for providing a personalized texting base. Although described below with regard to particular method steps, this is for illustrative purposes only, as the steps can be performed in any number of different orders, and can also include any number of different steps, so as to achieve the inventive concepts disclosed herein. Moreover, while the methods illustrated below can be implemented by (and in some cases, are described with respect to) the system 100 of FIG. 1, (or components thereof), these methods and/or method steps may also be implemented utilizing any suitable hardware implementation.

In operation, the site owner server can function to generate any number of presentation screens which can preferably be embodied in the form of a website and/or website pages that allow a user to upload, input and create contact lists which can receive text messages via the system. Each of these contacts can include unique data for each recipient. Although not illustrated, the site owner server can establish any number of presentation screens in the form of website pages, for example, such as a landing page that can provide information about the method and services provided by the site owner, along with options for registering new users, and login options for existing users.

Figure 2:
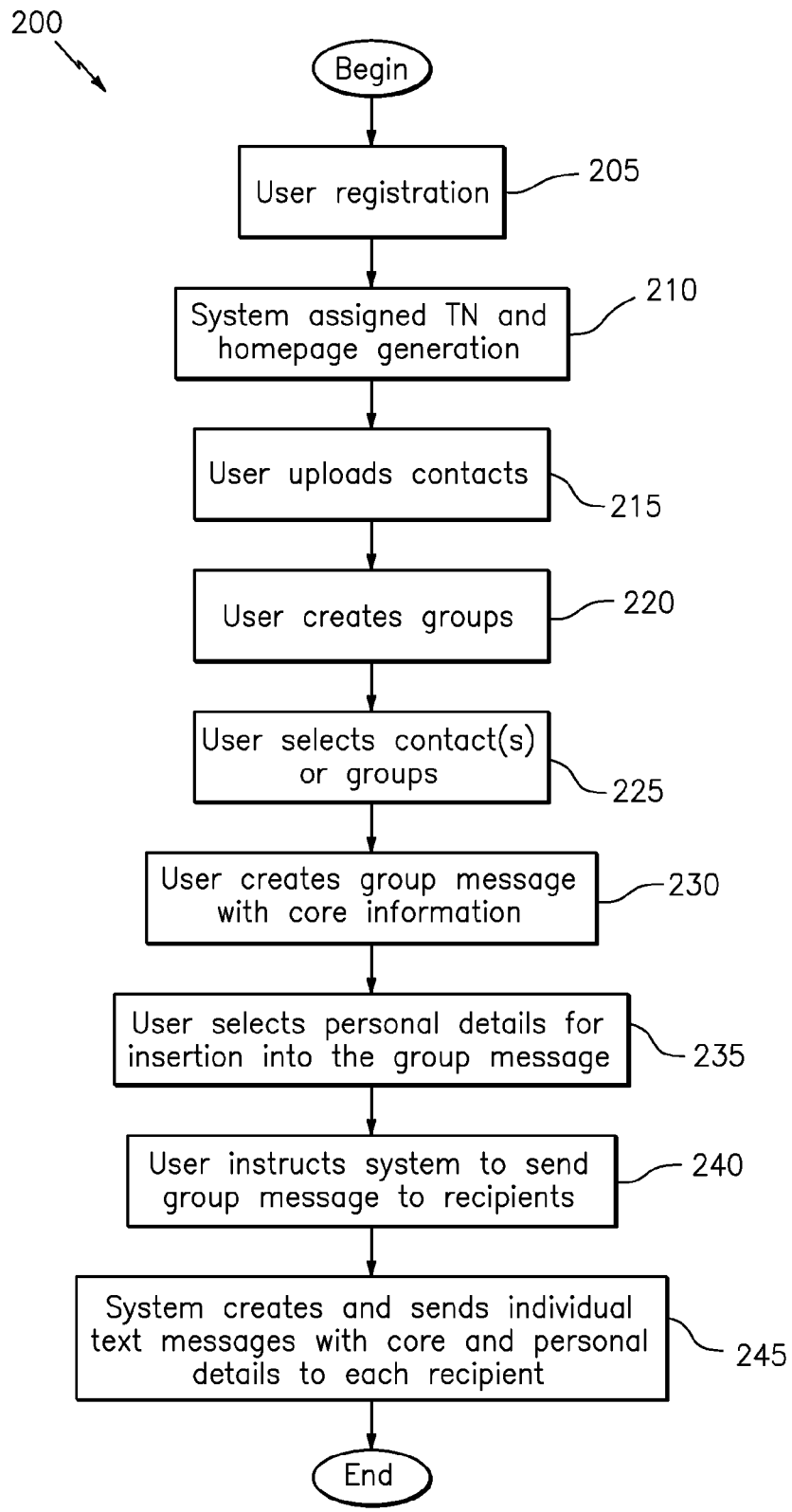
FIG. 2 shows an exemplary flow diagram illustrating a method for creating a texting base, according to one embodiment.

FIG. 2 is a flow chart illustrating an exemplary method 200 for providing a texting base, wherein a user can create and send group messages having uniform core content, and identifiers that are unique to each recipient. The method can begin at step 205 wherein a primary user can register an account with the Site Owner. Although outside the scope of this document, it is to be understood that establishing an account can include, for example, providing information about the user, establishing payment preferences and/or establishing membership status such as a paid or unpaid plan, for example.

In either instance, once the user has established an account the method can proceed to step 210, wherein the system can provide the user with user homepage, and can assign the user one or more unique telephone numbers for sending and receiving text messages. In one embodiment, the system can continually assign additional unique telephone numbers to a sender based on the area code of the senders address book. For example, if a sender has contacts located in area codes 123, 456 and 789, the system can assign the sender three distinct telephone numbers having the same area codes 123, 456, and 789. As will be described below, such a feature can ensure that whenever a recipient receives a text message from the sender, it will be from a local number.

In either instance, the textual communication can preferably be facilitated through a third party VOIP SMS text messaging service; however, any number of other options, platforms and mechanisms capable of generating telephone numbers and sending textual communications are also contemplated.

Figure 3A:
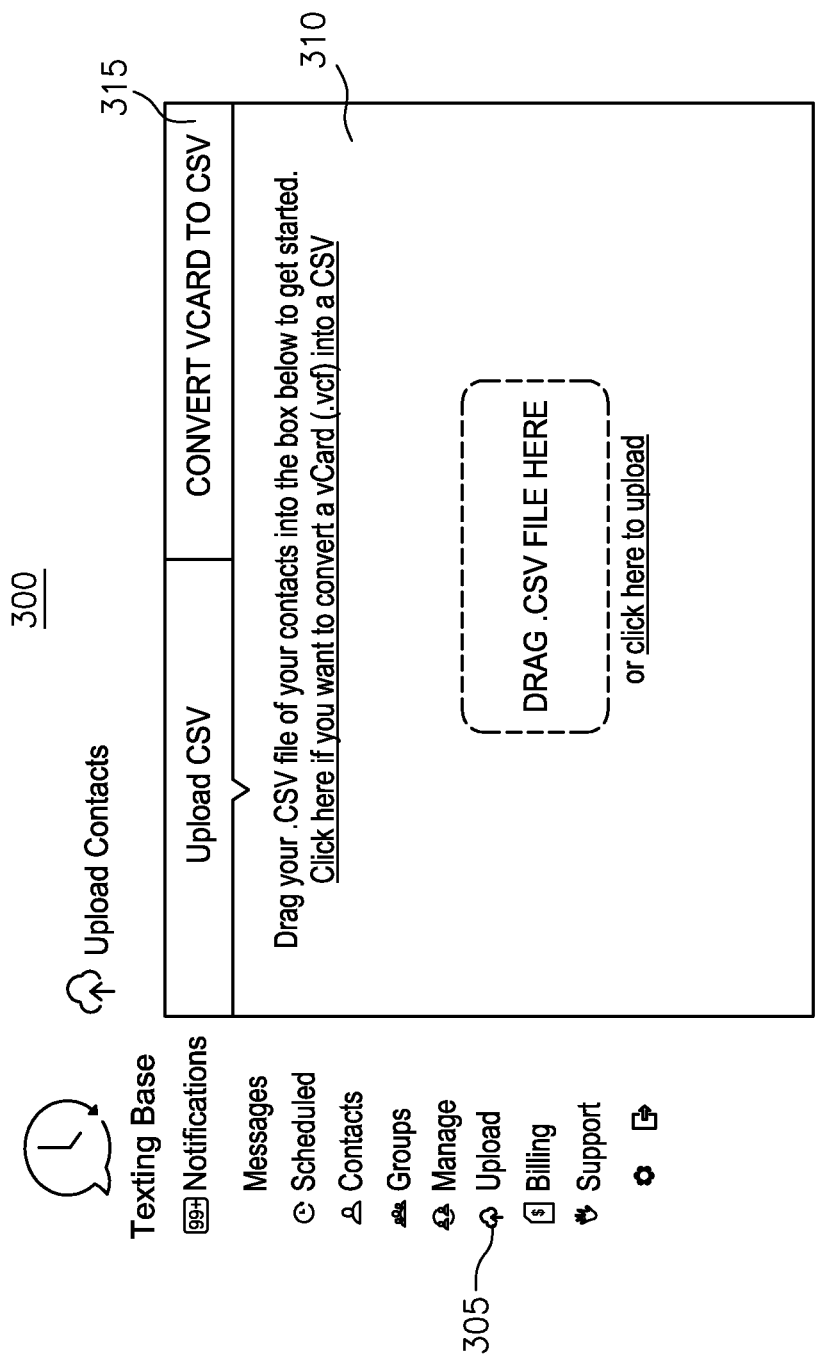
FIG. 3A shows an exemplary user interface of the system of FIG. 1.

Next, the method can proceed to step 215 wherein the user can be presented with options for uploading contacts for storage in the system database. In this regard, FIG. 3A is an exemplary presentation screen 300 illustrating an "Upload Contacts" section of the homepage. When a user selects the Upload option 305, the system can provide a drag and drop section 310 into which a .CSV file containing the user contacts and other such information can be placed. Upon receiving the file, the system can map and store the uploaded information for retrieval by the user, the data pull unit, the communication profiler unit, and/or the randomized response unit, for example.

Of course, the system is not limited to this form of contact input, as any number of other mechanisms and/or file formats for uploading user contact details are also contemplated. For example, the system can also receive Vcards as shown at 315 or manual inputs.

Figure 3B:
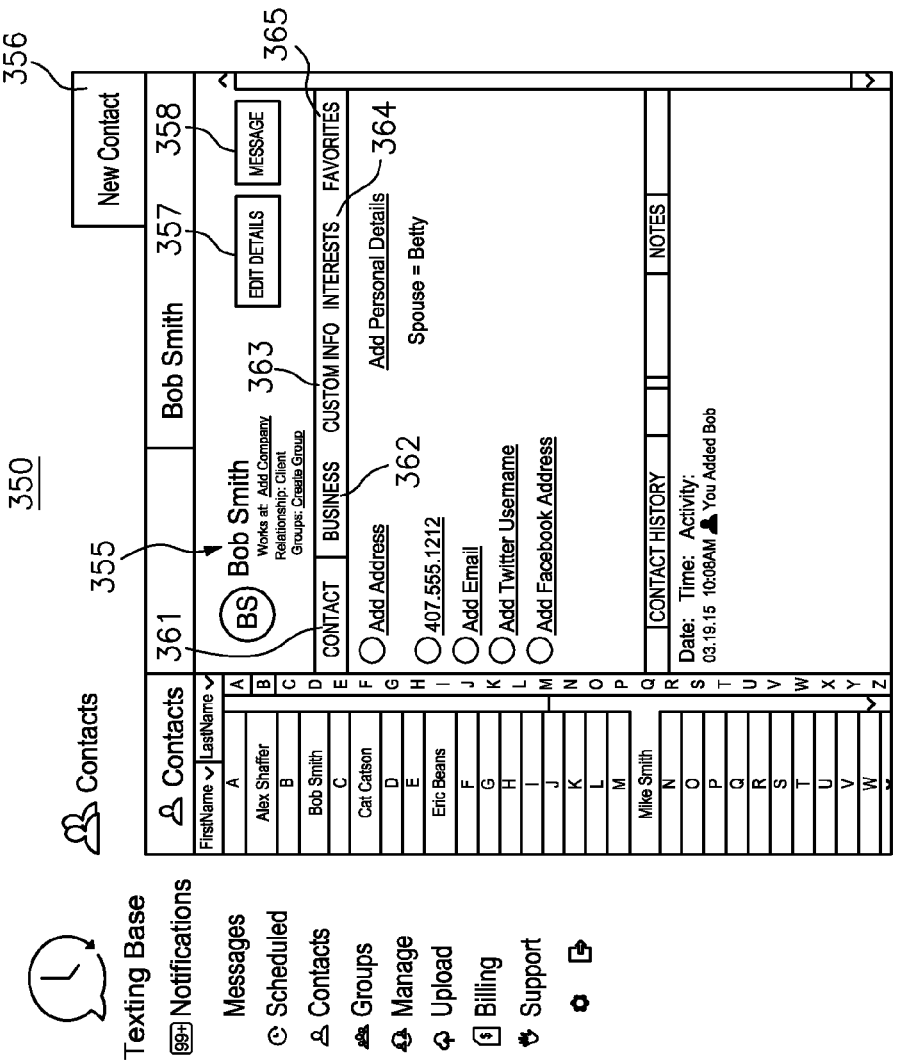
FIG. 3B shows another exemplary user interface of the system of FIG. 1.

FIG. 3B is an exemplary Contacts presentation screen 350 illustrating an individual contact 355 which was uploaded at step 215. Because the system is designed to allow users to send a group message to multiple contacts at once, while appearing to be an individual message, the contacts section of the system can receive and store an unlimited amount of unique information about each contact (i.e., unique recipient data). Several nonlimiting examples of contact information can include addresses, telephone numbers, emails, social media information, educational details, political affiliations, favorite sports team(s), automobiles, hobbies, favorite charities, and the like. This contact information will be available to the user for inclusion in group messages, as will be described below.

As shown, the Contacts section can include options for manually uploading contacts 356, editing contacts 357 and sending individual text messages to each contact 358. The contact information can be sorted into several different categories and headings such as "Contact" 361 "Business" 362, Custom Info" 363, "Interests" 364 and "Favorites" 365. With regard to the "Custom Info" tab, this feature can allow individual users to create their own category of customer information for storage by the database and later retrieval in group messages.

Figure 4:
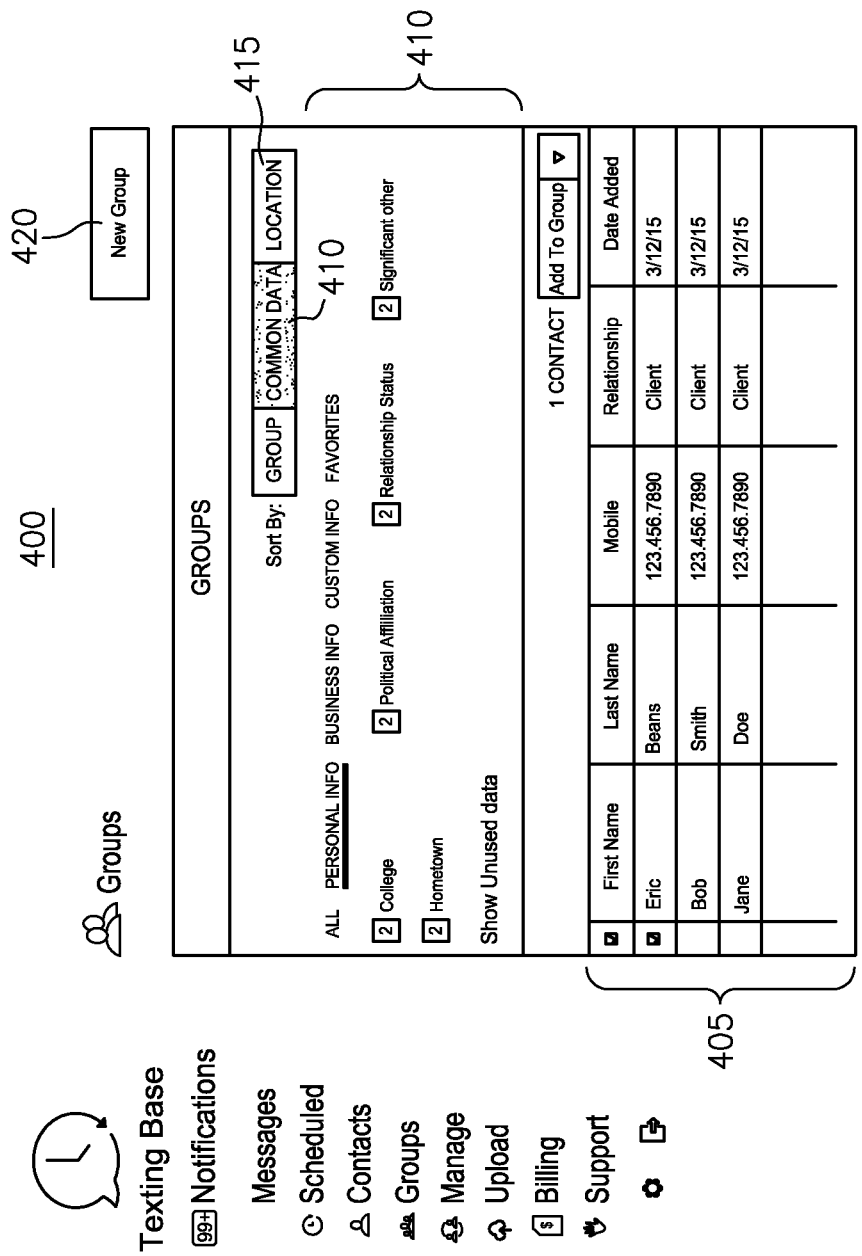
FIG. 4 shows another exemplary user interface of the system of FIG. 1.

Next, the method can proceed to step 220 wherein the user can create any number of different groups based on the stored contact information. In this regard, FIG. 4 is an exemplary "Groups" presentation screen 400 wherein a list of individual contacts 405 can be generated based upon a common identifier 410. As shown, the common identifier can include the information contained in the contact information uploaded in step 215, such as the personal info, business info, custom info and favorites, for example. In this regard, the system can allow a user to identify individual contacts having shared interests or affiliations. Additional sorting options include the ability to find contacts based on location, as shown by the location tab 415. Once identified, these contacts can be saved via the "New Group" tab 420, in order to receive a group message with substantially identical core content, but with details that are unique to the recipient.

Figure 5A:
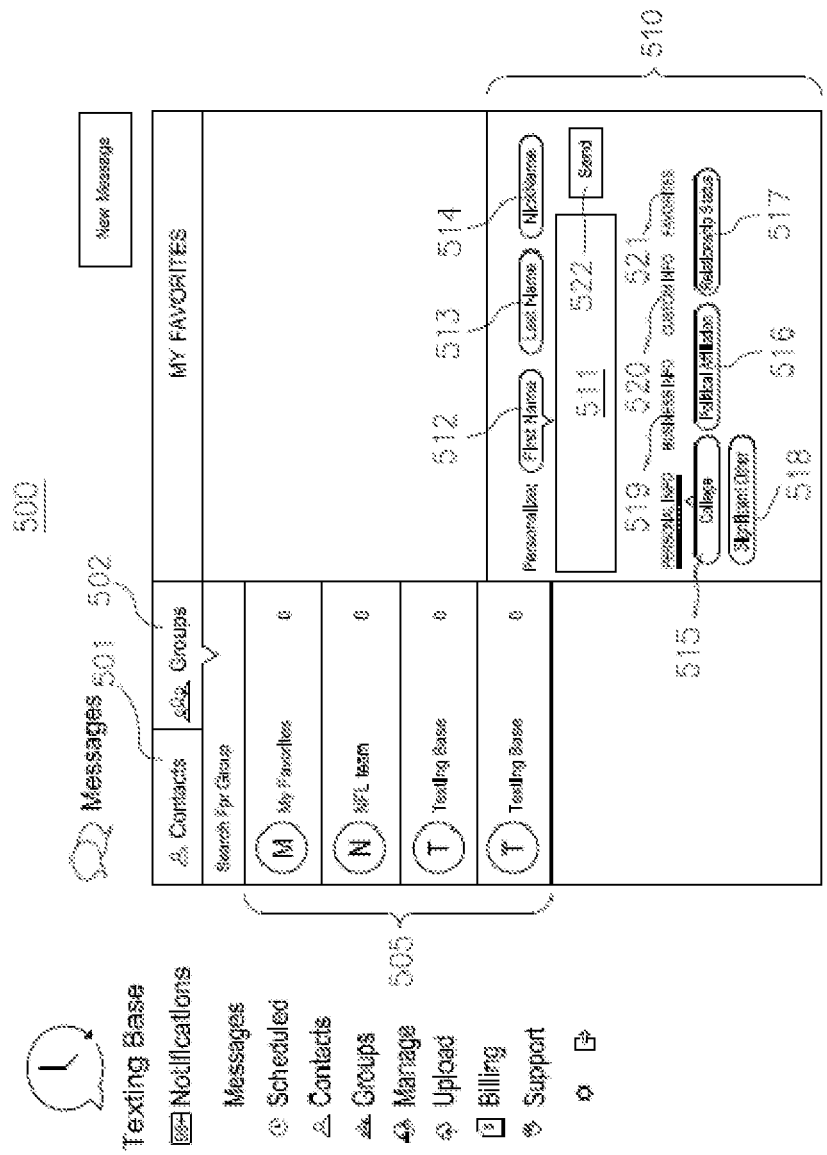
FIG. 5A shows another exemplary user interface of the system of FIG. 1.

Once one or more groups have been created, the method can proceed to step 225 wherein the user can identify one or more groups to receive a group message. In this regard, FIG. 5A, is an exemplary "Messages" presentation screen 500 wherein a list of individual contacts 501 or Groups 502 can be selected for receiving a message. As shown, the listing of Groups 505 can include a system generated list of groups based on shared information, as well as a listing of groups created by the user at step 220. Likewise, the contacts tab 501 allows the user to select any number of individual contacts that were stored in the database at step 215.

Once a group or list of individual contacts has been selected the user can create a group message. As shown in FIG. 5A, the system can provide a message input section 510 having a text box 511 into which a text message can be input and ultimately sent 522. Surrounding the text box 511 is a plurality of personal detail tabs for inserting unique recipient data into the message. Several such options include First Name 512, Last Name 513, Nickname 514, College 515, Political Affiliation 516, Relationship Status 517, and Significant Other 518. Additional options can be stored and retrieved under any number of categories such as Business Info 519, Custom Info 520 and/or Favorites 521, for example. In the preferred embodiment, the personalized information 512-521 can include the contact information uploaded at step 215. However, any number of additional details and/or information can also be obtained, stored and retrieved via different manners.

Figure 5B:
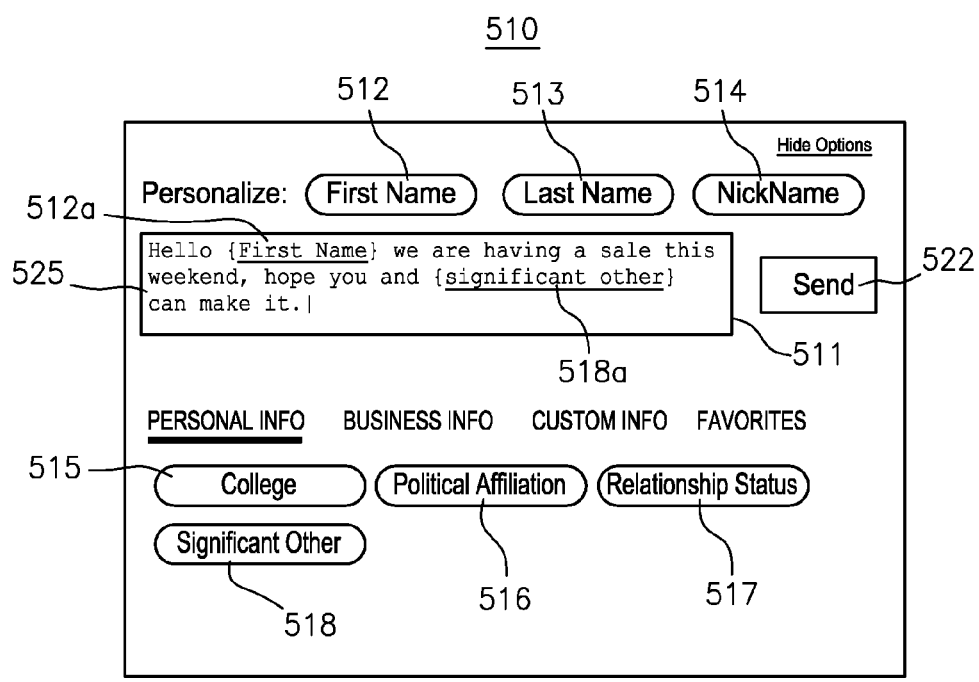
FIG. 5B shows another exemplary user interface of the system of FIG. 1.

The user can next create a group message at step 230. In this regard, FIG. 5B illustrates one example of a group message which can be created by a user of the system. As shown, a core message 525 (not underlined) can be input into the text box 511 of the message input section 510. In this illustrated example, the sender is creating a group message to notify each recipient about a sale this weekend. Next, the method can proceed to step 235 wherein the user can personalize the message that each recipient will receive, by inserting one or more of the above described personal details. In the present example, the user has selected detail tabs 512 and 518, and the system has inserted temporary markers representing the first name 512a of each recipient and their significant other 518a, respectively, into the group text. Lastly, the user can send the message at step 240.

Upon selecting the send tab 522, the method can proceed to step 245 wherein the system can automatically generate and send an individual text message to each recipient identified in step 225, wherein the temporary marker is replaced with the corresponding unique recipient data. In this regard, each recipient will receive a one-to-one text message from the sender. As such, the recipient device will not identify the received message as a "Group message".

Figure 5C:
FIG. 5C shows another exemplary user interface of the system of FIG. 1.

FIG. 5C, is an exemplary text message screen 550 of a recipient user device 110. As shown, each recipient will receive a text message 551 having both the core information and the unique recipient details of that recipient, as described above. In this regard, because the personal details are embedded within the sentence structure of the core information, the received text message will appear to be an individual message to the recipient from the sender 552. As such, the recipient will be much less likely to discard the message as spam. Moreover, as the message details only include the sender, any response from the recipient will go directly to the sender and not to other group recipients.

Figure 6A:
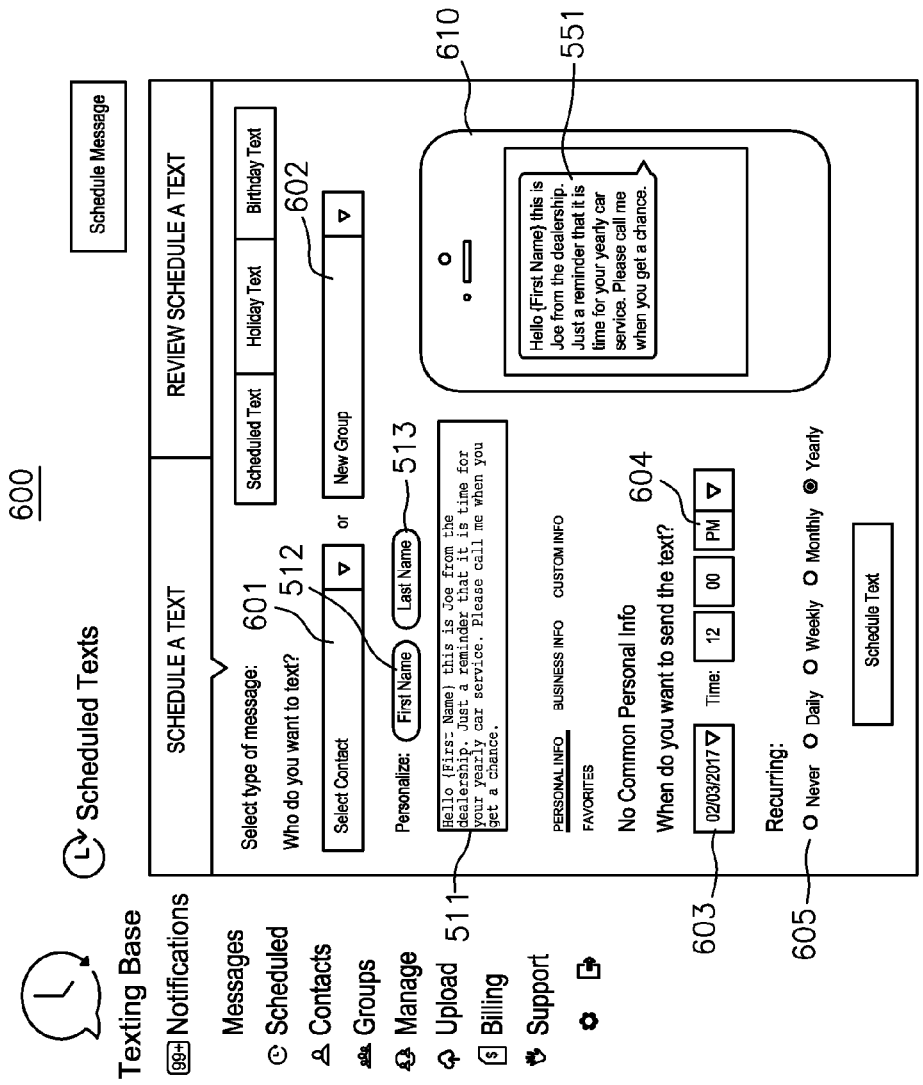
FIG. 6A shows another exemplary user interface of the system of FIG. 1.

In addition to creating and sending messages at one time, the system can include functionality for allowing a user to send messages at a future time, and/or on a recurring basis. To this end, FIG. 6A is an exemplary "Scheduled Texts" presentation screen 600 which can be generated by the system. As shown, the screen can include options for selecting individual contacts 601, and/or groups 602 that are to receive a message at a specified date 603, delivery time 604 and recurrence 605. The Scheduled Texts screen also includes the above described text box 511 and any number of personalized information tabs described above, such as the illustrated tabs 512 and 513, for example.

In the illustrated embodiment, the system can also generate a mockup 610 of what the resulting message 551 will look like on each recipient user device. Of course, the actual resulting message will include the actual personal data for the recipient, as described above with respect to FIG. 5C.

In another embodiment, the system can further include functionality for delivering a scheduled message at the selected time in each recipients time zone. In this regard, if two group members live in different time zones, the message will be delivered at the selected time in each of those time zones. Such a feature prevents recipients from receiving a text message at inappropriate times such as the middle of the night, for example.

Figure 6B:
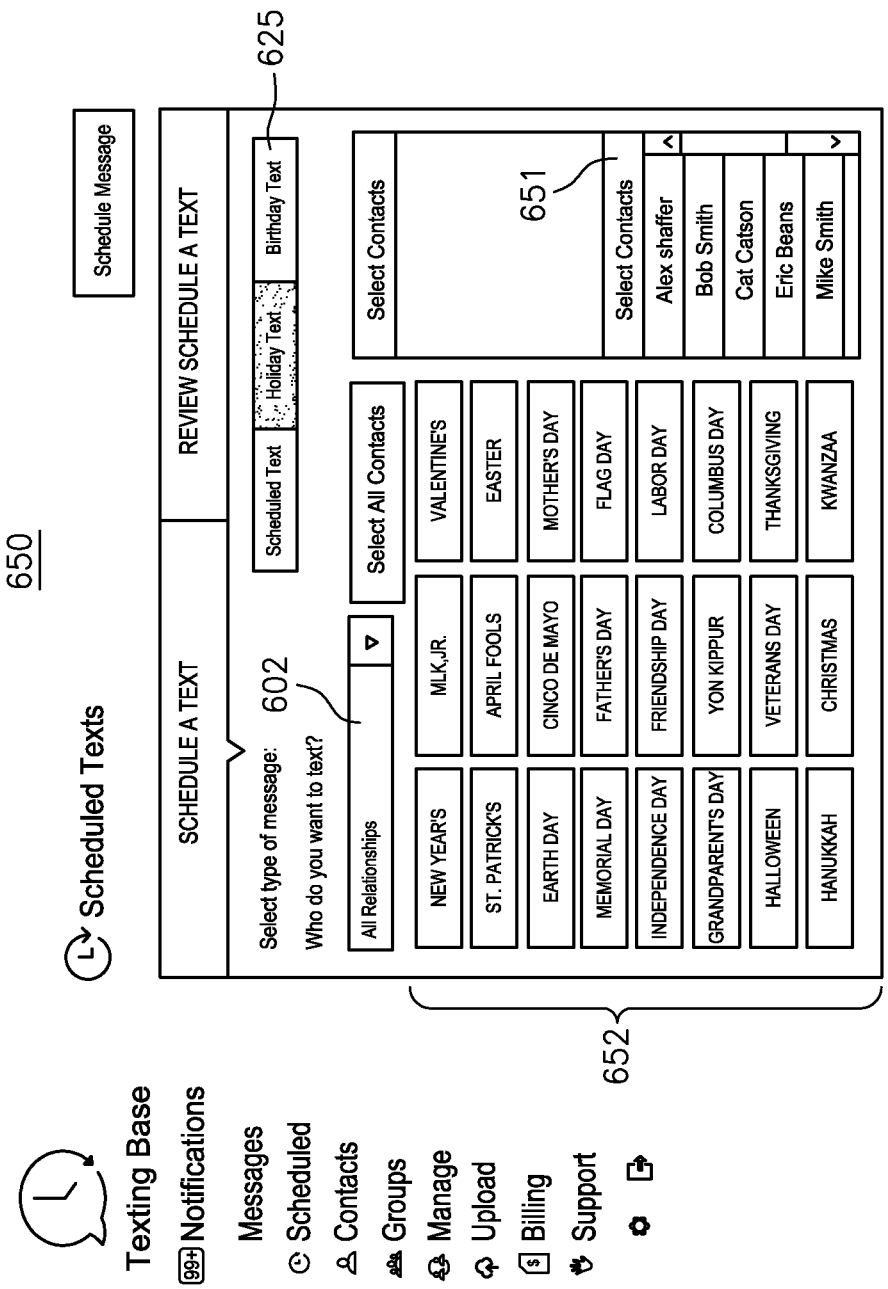
FIG. 6B shows another exemplary user interface of the system of FIG. 1.

In addition to creating completely custom messages, the system can include functionality for allowing users to send future and/or recurring messages based on different factors such as birthdays 625, or holidays for example. In this regard, FIG. 6B, is an exemplary "Holiday Text" presentation screen 650 wherein a user can select one or more groups 602 or contacts 651 to receive a holiday message. As shown, the system can include a list of national, international and/or local holidays 652 from which the user can select. Upon determining which groups or users are to receive a particular holiday message, the system can then generate and send the message on the selected holiday to the selected recipients, as described above, along with any additional information from the user.

By providing the above noted feature, the system can allow users to send group messages to individuals based upon common religions and/or observance of holidays, so as to prevent a user from unintentionally sending an inappropriate message to a customer.

Accordingly, the above described system and method can function to eliminate the appearance of impersonal "mass texts" and can allow scheduled personal communication in a meaningful way to recipients such as customers, friends and family. Moreover, the system and method can also provide functionality for scheduling messages weeks, months and even years in advance for any number of occasions such as holidays and birthdays, for example.

As will be obvious to those of skill in the art, the above described functionality can be performed utilizing any number of different algorithms, programmatic code and/or individual method steps and the like. To this end, the above noted functionality is provided to introduce the broad concepts of the personalized texting base and is not to be construed as limiting in any manner, as any number of variations can be performed without requiring undue experimentation, and in the spirit of the inventive concepts disclosed herein.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for creating a texting base, the method comprising:

establishing communication between a primary user interface device and a site owner system;

uploading, via the primary user interface device, one or more contacts, each of the one or more contacts including unique recipient data;

storing, via a system database, each of the one or more contacts;

assigning at least one unique telephone number to a primary user;

receiving, via the primary user interface device, a list of contacts to receive a group message;

generating, via the site owner system, a message presentation screen, said screen including a message input section having a text box and a plurality of personal detail tabs, each of said personal detail tabs corresponding to the unique recipient data;

receiving, via the primary interface device, a core message, and a selection of one or more personal detail tabs, inserting, via the site owner system, a temporary marker into the text box for each of the one or more selected personal detail tabs;

receiving a send notification from the primary user interface;

generating, via the site owner system, an individual text message for each recipient;

replacing, via the site owner system, each of the temporary markers with the unique recipient data corresponding to the selected personal detail tabs; and sending, via the site owner system, a text message to each selected contact over a communications network, wherein each text message includes the core message and the unique recipient data.

2. The computer implemented method of claim 1, wherein the unique recipient data includes a recipients: first name, last name, nickname, college, political affiliation, relationship status, business information, favorite topics, and significant other.

3. The computer implemented method of claim 1, further comprising:

receiving, via the user interface device, a request for a custom recipient data field;

generating, via the site owner system, a custom personal detail tab that corresponds to the custom recipient data field; and displaying the custom personal detail tab on the message presentation screen.

4. The computer implemented method of claim 1, further comprising:

receiving, via the primary user interface, instructions for generating one or more groups of contacts based upon the received unique recipient data.

5. The computer implemented method of claim 1, further comprising:

searching, via the site owner system, through the received unique recipient data of each of the primary users contacts; and generating one or more groups listing contacts having identical unique recipient data.

6. The computer implemented method of claim 1, further comprising:

searching, via the site owner system, the internet for articles about the unique data; and displaying an internet search result to the primary user device.

7. The computer implemented method of claim 1, wherein the unique recipient data for each of the one or more contacts includes a recipients area code and telephone number; and assigning the primary user a plurality of telephone numbers having area codes that correspond to each recipient area code.

8. The computer implemented method of claim 7, wherein said sending is performed by the assigned telephone number that corresponds to the recipients area code.

9. A computer implemented method for creating a texting base, the method comprising:

establishing communication between a primary user interface device and a site owner system;

uploading, via the primary user interface device, one or more contacts, each of the one or more contacts including unique recipient data;

storing, via a system database, each of the one or more contacts;

assigning at least one unique telephone number to a primary user;

receiving, via the primary user interface device, a list of contacts to receive a group message;

generating, via the site owner system, a scheduled message presentation screen, said screen including a message input section having a text box and a plurality of personal detail tabs, each of said personal detail tabs corresponding to the unique recipient data, a delivery date selection tab, a delivery time selection tab, and a recurrence selection tab;

receiving, via the primary interface device, a requested delivery date, a requested delivery time, a requested recurrence, a core message, and a selection of one or more personal detail tabs, inserting, via the site owner system, a temporary marker into the text box for each of the one or more selected personal detail tabs;

receiving a send notification from the primary user interface;

generating, via the site owner system, an individual text message for each recipient;

replacing, via the site owner system, each of the temporary markers with the unique recipient data corresponding to the selected personal detail tabs; and sending, via the site owner system, a text message to each selected contact on the requested delivery date and time, wherein each text message includes the core message and the unique recipient data.

10. The computer implemented method of claim 9, wherein the delivery time is based on a time zone of the recipient.

11. The computer implemented method of claim 9, further comprising:

generating a plurality of pre-populated holidays for selection by the primary user.

12. The computer implemented method of claim 11, wherein upon selection of a pre-populated holiday, the system automatically selects the delivery date selection tab.

13. The computer implemented method of claim 9, wherein the unique recipient data for each of the one or more contacts includes a recipients area code and telephone number; and assigning the primary user a plurality of telephone numbers having area codes that correspond to each recipient area code.

14. The computer implemented method of claim 13, wherein said sending is performed by the assigned telephone number that corresponds to the recipients area code.

* * * * *